US010377357B2

(12) United States Patent
Wieder et al.

(10) Patent No.: US 10,377,357 B2
(45) Date of Patent: Aug. 13, 2019

(54) METHOD FOR ELECTRONICALLY REGULATING THE BRAKING FORCE DISTRIBUTION IN A PRESSURE MEDIUM-ACTIVATED BRAKE SYSTEM OF A VEHICLE AND PRESSURE MEDIUM-ACTIVATED BRAKE SYSTEM OF A VEHICLE HAVING SUCH A REGULATING MEANS

(71) Applicant: KNORR-BREMSE SYSTEME FUER NUTZFAHRZEUGE GMBH, Munich (DE)

(72) Inventors: Gerhard Wieder, Besigheim (DE); Adnan Mustapha, Maulbronn (DE); Andreas Schaefers, Hemmingen (DE); Falk Hecker, Markgroeningen (DE); Christian Weber, Schwiegerdingen (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 46 days.

(21) Appl. No.: 15/580,491

(22) PCT Filed: Jun. 2, 2016

(86) PCT No.: PCT/EP2016/000912
§ 371 (c)(1),
(2) Date: Dec. 7, 2017

(87) PCT Pub. No.: WO2016/202434
PCT Pub. Date: Dec. 22, 2016

(65) Prior Publication Data
US 2018/0170330 A1      Jun. 21, 2018

(30) Foreign Application Priority Data
Jun. 16, 2015    (DE) .................. 10 2015 109 630

(51) Int. Cl.
*B60T 8/00* (2006.01)
*B60T 8/1766* (2006.01)
(Continued)

(52) U.S. Cl.
CPC ............ *B60T 8/1766* (2013.01); *B60T 8/172* (2013.01); *B60T 8/268* (2013.01); *B60T 8/34* (2013.01)

(58) Field of Classification Search
None
See application file for complete search history.

(56) References Cited

U.S. PATENT DOCUMENTS

| 4,840,434 A | 6/1989 | Leiber |
| 6,398,321 B1 * | 6/2002 | Atkins ................. B60T 8/172 |
| | | 303/158 |

(Continued)

FOREIGN PATENT DOCUMENTS

| DE | 2208286 A1 | 9/1972 |
| DE | 3431326 A1 | 3/1986 |

(Continued)

OTHER PUBLICATIONS

International Search Report dated Sep. 6, 2016, of the corresponding International Application PCT/EP2016/000912 filed Jun. 2, 2016.

*Primary Examiner* — Jonathan M Dager
(74) *Attorney, Agent, or Firm* — Gerard Messina

(57) ABSTRACT

A method and computer program for electronically regulating the brake force distribution in a pressure medium-operated brake system of a vehicle having at least one front axle brake circuit, associated with a front axle, and at least one rear axle brake circuit, associated with at least one rear axle, in which when the brake system is operated, a rear axle brake pressure, acting in the at least one rear axle brake (Continued)

circuit, is regulated to prevent locking of the rear wheels before locking of the front wheels, and in which the brake pressure at the rear axle is limited only while a pressure value which acts in the rear axle brake circuit is below a prespecified pressure threshold value, but the brake pressure at the rear axle is not limited if the pressure value acting in the rear axle brake circuit is not less than the prespecified pressure threshold value.

12 Claims, 1 Drawing Sheet

(51) Int. Cl.
*B60T 8/26* (2006.01)
*B60T 8/172* (2006.01)
*B60T 8/34* (2006.01)

(56) References Cited

U.S. PATENT DOCUMENTS

| | | | | |
|---|---|---|---|---|
| 6,595,600 B2* | 7/2003 | Banno | ............ | B60T 8/1766 303/113.5 |
| 7,226,134 B2* | 6/2007 | Horn | ............ | B60T 8/1708 303/123 |
| 8,655,569 B2* | 2/2014 | Choby | ............ | G06F 19/00 180/197 |
| 8,740,317 B2* | 6/2014 | Wu | ............ | B60T 8/1708 303/123 |
| 8,977,467 B2* | 3/2015 | Herges | ............ | B60T 8/172 701/50 |
| 9,031,754 B2* | 5/2015 | Matoy | ............ | B60T 8/1708 701/70 |
| 10,239,505 B2* | 3/2019 | Boethel | ............ | B60T 8/1708 |
| 2004/0262990 A1* | 12/2004 | Check | ............ | B60T 8/172 303/113.1 |
| 2005/0001477 A1* | 1/2005 | Mederer | ............ | B60T 8/1708 303/113.5 |
| 2006/0170283 A1* | 8/2006 | Alvarez | ............ | B60T 8/1766 303/155 |
| 2006/0287797 A1* | 12/2006 | Haller | ............ | B60T 8/1708 701/70 |
| 2009/0134698 A1* | 5/2009 | Herges | ............ | B60T 8/1766 303/113.2 |
| 2012/0217794 A1* | 8/2012 | Wieder | ............ | B60T 15/027 303/113.2 |
| 2013/0080014 A1* | 3/2013 | Wieder | ............ | B60T 8/1766 701/71 |
| 2015/0046057 A1* | 2/2015 | Lauser | ............ | B60T 7/042 701/79 |
| 2015/0197226 A1* | 7/2015 | Svensson | ............ | B60T 8/268 701/70 |
| 2016/0052494 A1* | 2/2016 | Yamamoto | ............ | B60T 7/12 701/70 |
| 2016/0068144 A1* | 3/2016 | Hummel | ............ | B60T 7/20 701/78 |
| 2017/0267221 A1* | 9/2017 | Hecker | ............ | B60T 7/085 |
| 2018/0215359 A1* | 8/2018 | Eckert | ............ | B60T 7/042 |

FOREIGN PATENT DOCUMENTS

| | | |
|---|---|---|
| DE | 4309243 A1 | 9/1994 |
| DE | 4401995 C1 | 4/1995 |
| DE | 19541601 A1 | 5/1997 |
| DE | 19620583 A1 | 11/1997 |
| DE | 102006045317 A1 | 5/2007 |
| DE | 102011118130 A1 | 5/2013 |
| GB | 1337911 | 11/1973 |

\* cited by examiner

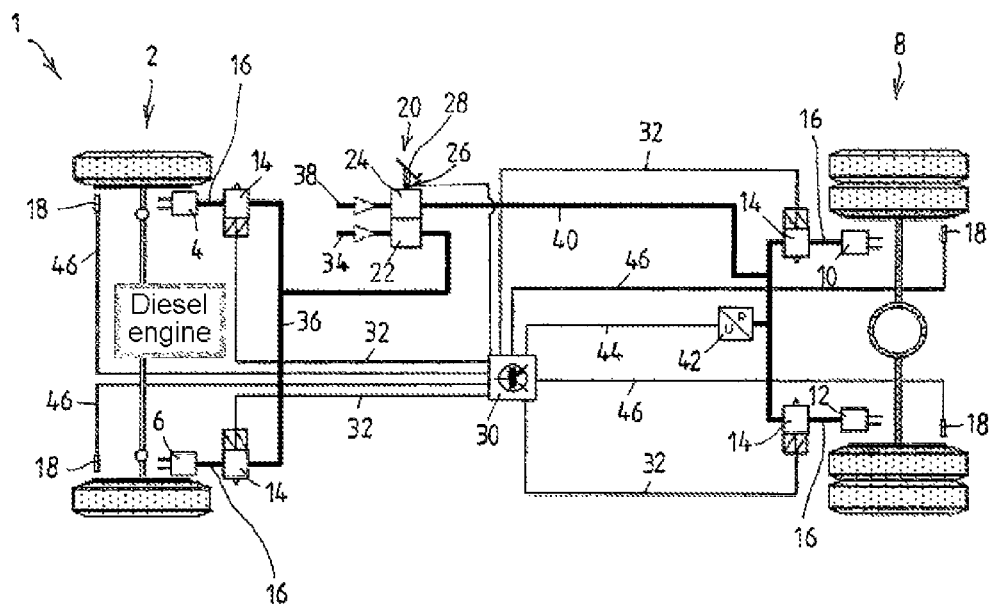

METHOD FOR ELECTRONICALLY REGULATING THE BRAKING FORCE DISTRIBUTION IN A PRESSURE MEDIUM-ACTIVATED BRAKE SYSTEM OF A VEHICLE AND PRESSURE MEDIUM-ACTIVATED BRAKE SYSTEM OF A VEHICLE HAVING SUCH A REGULATING MEANS

FIELD OF THE INVENTION

The present invention is based on a method for electronically regulating the brake force distribution in a pressure medium-operated brake system of a vehicle having at least one front axle brake circuit, which is associated with a front axle, and at least one rear axle brake circuit, which is associated with a rear axle, wherein, when the brake system is operated, a rear axle brake pressure, which acts in the at least one rear axle brake circuit, is regulated with the objective of preventing locking of the rear wheels before locking of the front wheels.

The present invention is further based on a pressure medium-operated brake system of a vehicle having at least one front axle brake circuit, which is associated with a front axle, and at least one rear axle brake circuit, which is associated with at least one rear axle, and comprising an electronic regulating arrangement for the brake force distribution, in the case of which, when the brake system is operated, a rear axle brake pressure, which acts in the at least one rear axle brake circuit, is regulated with the objective of preventing locking of the rear wheels before locking of the front wheels, at least one pressure switch is provided in a brake circuit, which pressure switch generates an activation signal for activating the electronic regulating arrangement for the brake force distribution depending on a pressure value, which acts in the brake circuit, in relation to a prespecified pressure threshold value, wherein the electronic regulating arrangement is configured in such a way that the brake pressure at the rear axle is limited only while the activation signal is generated or is present, but the brake pressure at the rear axle is not limited if an activation signal is not generated or is not present.

BACKGROUND INFORMATION

In heavy utility vehicles, a diesel engine, which drives the rear axle via a cardan shaft, is generally installed above the front axle. Owing to this arrangement, the load on the rear axle depends to a great extent on the loading of the utility vehicle. For this reason, the brake force which is applied by the driver via the brake pedal at the rear axle is limited in conventional brake systems by a pneumatic valve with an axial load sensor (ALB, automatically load-dependent brake). This ensures that, in the case of an unladen vehicle, the entire brake pressure which is desired by the driver is not present at the rear axle, and therefore the tendency of the rear axle to lock is reduced. In addition, a greater degree of braking comfort is possible and the service life of the rear axle brake is extended.

In addition to the automatically load-dependent brake (ALB), contemporary utility vehicles have an anti-lock brake system (ABS). This has a rotation speed sensor (inductive sensor) on each wheel, and a pressure control valve which can modulate the pressure set by the driver by the brake pedal. The ABS is activated when there is a tendency of a wheel to lock.

What is referred to as an EBD (electronic brake force distribution) function is believed to be discussed, for example, in DE 10 2006 045 317 A1, said EBD function implementing the automatically load-dependent brake (ALB function) with the aid of ABS pressure control valves, and therefore eliminating the need for the load valve. Since, in contrast to the automatically load-dependent brake (ALB), the ABS does not have a load sensor, the loading state is determined during braking with the aid of the speed difference between the front axle and the rear axle (vVA-vHA). The lower the rear axle load, the more slip occurs at the rear axle with the same brake operation, i.e. the greater the speed difference vVA-vHA. The difference between the laden and unladen vehicle has a significantly smaller effect at the front axle because of the arrangement of the engine. The speed difference vVA-vHA during braking can therefore be used as a measure for the loading. In other words, during a braking process, EBD blocks the rear axle brakes, and under certain circumstances also an individual rear wheel, from the further build-up of pressure, depending on the differential slip between the front and the rear axle, by activating the ABS valves. However, if the front axle brakes are defective, that is to say the front axle brakes more weakly than normal or even not at all, the speed difference vVA-vHA can become very large. The EBD function would then set the ABS valves at the rear axle to maintain pressure and limit the brake pressure at the rear axle. However, in this case, the utility vehicle would be underbraked. Furthermore, in the case of a vehicle which is laden only to a very small degree or unladen, the problem arises that the brake pressure regulation is not very sensitive since in this case the differential slip between the front axle and the rear axle becomes relatively large and a prespecified differential slip threshold value is quickly exceeded.

Patent document DE 10 2011 118 130 B4 therefore presents a method for electronically regulating the brake force distribution depending on a differential slip or differential speed between at least one wheel of the front axle and at least one wheel of the rear axle of a vehicle, in which, when a differential slip threshold value or a differential speed threshold value is exceeded by the differential slip or the differential speed, the brake pressure at the rear axle is limited. In this case, the differential slip threshold value or the differential speed threshold value is determined depending on the braking request. In other words, a relatively small differential slip threshold value is set in the case of a relatively low driver braking request, and a relatively large differential slip threshold value is set in the case of a relatively large braking request. The regulating logic system is therefore configured such that, during normal braking with a low or medium braking request and in the case of a vehicle with low loading or an unladen vehicle, an intervention takes place before the ABS regulation starts at the rear axle. Heavy braking operations are identified by the detected driver braking request. A more sensitive transition to ABS regulation is ensured by corresponding adaptation of the differential slip threshold depending on the detected driver braking request. The braking request by the driver is detected by a pressure sensor in a pneumatic rear axle brake circuit or rear axle channel and/or by an electrical signal of an electric brake value transmitter in a digital foot brake module. However, one disadvantage of this is that an electrical pressure sensor of this kind is a relatively expensive component.

Regulation of the brake force distribution (EBD) in the outlined manner, in which the difference between the brake slip at the front axle and the brake slip at the rear axle serves as a control variable therefore has the disadvantage that, in the event of a failure of the brake circuit at the front axle, the pressure limiting operation at the rear wheels by the EBD regulating arrangement starts too early. This disadvantage is noticeable, in particular, in the case of front axle/rear axle brake circuit division because, in this case, both front wheel brakes are connected to the same pressure medium circuit and consequently a failure of the two front wheel brakes is accompanied by excessively low pressure at the two rear wheels. In order that the vehicle deceleration of 30% in the event of a failure in the brake circuit required in accordance with ECE guidelines can also be fulfilled by the rear axle brake circuit alone, a brake force distribution with brake force reduction in the rear axle brake circuit has to be suppressed in a case of this kind of a defective front axle brake circuit being identified.

According to DE 43 09 243 A1 of this generic type, the disadvantages outlined above are avoided with the aid of a pressure switch or pressure sensor which is installed in the front wheel brake circuit or circuits if it is ensured that the EBD regulation operation takes place only if the pressure switch or pressure sensor indicates the presence of brake pressure in the front wheel brakes. If the signal is not present, an EBD regulation operation is suppressed and as a result ensures that any limiting of the rear wheel brake pressure by the EBD regulating arrangement does not take place. Therefore, an EBD regulation operation is possible only when the pressure switch is open because it is only then ensured that pressure is building up in the front axle. However, this safety measure does not take into account the fact that, although a front axle brake pressure is formed in the front axle brake circuit, the front axle brake does not deliver any front axle brake force or delivers an only insufficient front axle brake force on account of mechanical failure of the front axle brake, for example on account of unfavorable friction conditions between the friction partners of the friction brake or owing to failure of the brake mechanism. In a case of this kind, an electronic brake pressure distribution arrangement, for example in accordance with the differential slip, would establish a relatively high differential slip between the wheels of the front axle and the wheels of the rear axle even though there is no tendency for the brakes of the wheels at the rear axle to lock, and then limit the brake pressure in the rear axle brake circuit on account of the differential slip threshold value being exceeded. This would lead to an undesired loss in brake force and therefore to a relatively long braking travel.

In contrast, the invention is based on the object of further developing a method and an apparatus of the kind mentioned at the outset in such a way that as high a braking power as possible is still achieved at low production costs in the event of failure of the front axle brake circuit.

According to the invention, this object is achieved by the method and apparatus described herein.

SUMMARY OF THE INVENTION

The method according to the invention provides that the brake pressure at the rear axle is limited only while a pressure value which acts in the rear axle brake circuit is below a prespecified pressure threshold value, but the brake pressure at the rear axle is not limited if the pressure value which acts in the rear axle brake circuit is equal to or greater than the prespecified pressure threshold value.

In the case of the apparatus, it is provided according to the invention that the brake circuit in which the pressure switch is provided is the rear axle brake circuit, and that the pressure switch is configured such that it delivers the activation signal when a pressure value, which acts in the rear axle brake circuit, falls below its switching pressure, i.e. is below the prespecified pressure threshold value, and which otherwise does not deliver an activation signal of this kind.

Limiting the pressure or brake pressure at the rear axle means that said pressure or brake pressure is limited in relation to a higher value which is prespecified in accordance with the driver braking request. In this case, a pressure value is intended to be understood as a pressure value of any pressure which is carried in a rear axle brake circuit. This can be the brake pressure which acts in the wheel brake cylinders of a rear axle or a pressure as is carried at the outset by an ABS pressure control valve that is arranged in the rear axle brake circuit and can, however, still lower this pressure as part of an ABS regulation intervention, so that a relatively lower brake pressure is generated.

In other words, until the pressure threshold value is reached by the pressure value or brake pressure value in the rear axle brake circuit or in the rear axle brake circuits, electronic regulation of the brake pressure or brake force distribution is carried out and, in the case of a pressure value or brake pressure value which is equal to or greater than the pressure threshold value, the electronic regulation of the brake pressure or brake force distribution is turned off. In this case, the pressure threshold value is the switching pressure of the pressure switch.

If the front axle brake circuit then fails, for example for the reasons cited above, but a front axle brake pressure is nevertheless formed, the electronic brake pressure distribution establishes, for example in accordance with the differential slip principle, a relatively high differential slip between the wheels of the front axle and the wheels of the rear axle even though there is no tendency of the brakes of the wheels at the rear axle to block and therefore no change in the brake pressure distribution would be necessary either. The driver determines the diminishing braking effect and then instinctively increases the braking request, as a result of which the brake pressure arising in the pressure switch or control pressure in the rear axle brake circuit or in the rear axle brake circuits increases and, when the pressure threshold value is exceeded, the pressure switch no longer delivers an activation signal for activating the electronic brake pressure distribution or keeping said electronic brake pressure distribution active. Consequently, the rear axle brake pressure can no longer be limited, and for this reason the brakes at the rear axle or rear axles are operated with the full brake pressure in relation to the braking request in order to be able to deliver as high a braking power as possible.

Secondly, a pressure switch of this kind is less costly than a pressure sensor as in DE 10 2011 118 130 B4 as explained above for example, and therefore the apparatus according to the invention can be produced in a cost-effective manner. In contrast, the losses in comfort are low.

Finally, the activation signal for electronically regulating the brake pressure or brake force distribution is generated until the pressure threshold value is reached, so that said electronic regulation is active until said pressure threshold value is reached, this having a positive effect on driving stability because locking of the brakes of the rear axle is prevented even before, for example, the ABS regulation is active. When the pressure threshold value has then been reached or exceeded, the electronic regulation of the brake pressure or brake force distribution is turned off. However, the brake slip regulating arrangement (ABS) then ensures that excessive locking of the brakes at the rear axle is avoided, so that driving stability is also ensured in this case too.

Advantageous developments of and improvements to the invention specified in claims 1 and 5 are possible owing to the measures outlined in the dependent claims.

The pressure threshold value or the switching pressure of the pressure switch may be approximately 3 bar. Since the brake pressure is in a range of between 0 bar and approximately 2.5 bar in the majority of braking operations in pneumatic or electropneumatic brake systems of utility vehicles, the majority of the braking operations take place with the convenient electronic regulation of the brake force or brake pressure distribution. In rare cases, the brake pressure reaches or exceeds the pressure threshold value of approximately 3 bar.

The brake system particularly may have at least one brake light switch and operation of the brake system is identified by a brake light switch signal which is output by the brake light switch, wherein the brake pressure at the rear axle is limited only when a brake light switch signal which represents operation of the brake is present, but the brake pressure at the rear axle is not limited if a brake light switch signal which represents operation of the brake is not present.

Therefore, in combination in relation to the features of claims 1 and 5, firstly the activation signal has to be generated by the pressure switch and secondly the brake light switch signal, which represents operation of the brake, from the brake light switch also has to be present for activating the electronic brake pressure or brake force distribution or limiting the rear axle brake pressure. Therefore, a combined presence of two signals ensures that the electronic regulation of the brake pressure or brake force distribution or limiting of the rear axle brake pressure is activated only when required.

According to one development, the electronic regulating arrangement for the brake force distribution is regulated depending on a differential slip or differential speed between at least one wheel of the front axle and at least one wheel of the rear axle, wherein, when the brake is operated and when a differential slip threshold value or a differential speed threshold value is exceeded by the differential slip or the differential speed, the brake pressure at the rear axle is limited.

The pressure medium-operated brake system or the electronic regulating arrangement thereof for the brake force distribution depending on a differential slip or differential speed between at least one wheel of the front axle and at least one wheel of the rear axle of a vehicle then may contain:
  a sensor for measuring the wheel rotation speeds of the wheel of the front axle,
  a sensor for measuring the wheel rotation speeds of the wheel of the rear axle,
  an electronic control device for calculating the differential slip or a differential rotation speed between the at least one wheel of the front axle and the at least one wheel of the rear axle, wherein
  the electronic control device is configured in such a way that, when a differential slip threshold value or a differential speed threshold value is exceeded by the differential slip or by the differential speed, the brake pressure at the rear axle is limited.

According to one development, the electronic control device or the electronic regulating arrangement for the brake force distribution can further be configured in such a way that, when excessive brake slip is present, it executes a brake slip regulation operation (ABS), wherein the brake pressure at the rear axle is limited by at least one ABS pressure control valve which is arranged in the rear axle brake circuit.

Electronic regulation of the brake force distribution in the above-described manner is then realized with the aid of the ABS pressure control valves, without further components, such as a load valve for example, being required for this purpose.

Since the electronic regulation of the brake force distribution is implemented in software and uses only hardware which already exists as part of the ABS function anyway, such as wheel rotation speed sensors and pressure control valves, wherein only one pressure switch is still required, this function can be realized in a cost-effective manner. In particular, it is possible to retrofit an existing brake device with an EBD function in a simple manner.

More details are apparent from the following description of an exemplary embodiment.

An exemplary embodiment of the invention is illustrated below in the drawing and explained in greater detail in the following description.

BRIEF DESCRIPTION OF THE DRAWING

The FIGURE shows a schematic circuit diagram of a pneumatic brake device of a utility vehicle as an exemplary embodiment of a pressure medium-operated brake system according to the invention.

DETAILED DESCRIPTION

A brake device, such as, for example, a pneumatic brake device, denoted by 1 in the FIGURE, of a vehicle, in particular a utility vehicle, has two pneumatic brake cylinders 4, 6 on a vehicle front axle 2, and two pneumatic brake cylinders 10, 12 on the vehicle rear axle 8. The utility vehicle has, for example, a diesel engine as a front-mounted engine which drives the wheels of the rear axle 8 via a cardan shaft, not shown here. The brake cylinders 4, 6, 10, 12 are each assigned a pressure control valve arrangement 14 which serves to modulate the brake pressure, here, in particular, embodied as an ABS pressure control valve for reducing, maintaining and increasing the pressure as part of a brake slip regulation operation (ABS). Said pressure control valves are each connected to the respective brake cylinder 4, 6, 10, 12 by a brake line 16. As an alternative, the brake device 1 could also be an electropneumatic brake device or an electronic brake system (EBS) with pressure control modules as the pressure control arrangement. Here, the pneumatic brake cylinders 4, 6, 10, 12 act, for example, on disk brakes.

In addition, a wheel rotation speed sensor 18 for monitoring the wheel rotation behavior is connected to each of the wheels of the two vehicle axles 2, 8. The brake device 1 is therefore configured for brake and/or drive slip regulation (ABS and/or ASR). The brake device 1 is further equipped with a brake value transmitter 20 which here has two pneumatic channels 22 and 24 and also, for example, a brake light switch 26 for generating an electrical signal which is dependent on operation of a foot brake pedal 28. When the foot brake pedal 28 is operated, the brake light switch 26 therefore generates a signal which can light up brake lights, not illustrated here, of the vehicle.

An electronic control device 30 of the brake device 1 is connected via a line network 32 to the pressure control valve arrangements 14 of the two axles 2, 8. The two pneumatic channels 22 and 24 of the brake value transmitter 20 are, in terms of their configuration, commercially available, dual-circuit service brake valves. The pneumatic front axle channel 22 of the brake value transmitter 20 is connected on the energy inflow side to a supply line 34 which is connected to a compressed air store, not shown here, and on the energy outflow side to the pressure control valves 14 of the front axle 2 by a control line 36. The pneumatic rear axle channel 24 is connected to a compressed air store, likewise not shown, by a supply line 38, and to the pressure control valves 14 of the rear axle 8 by a control line 40. Therefore, a front axle channel and a rear axle channel of the pneumatic brake device 1 of the vehicle can be controlled by way of the pneumatic channels 22 and 24 of the brake value transmitter 20. In addition, a pressure switch 42 can be installed in the control line 40 of the rear axle channel, which pressure switch 42 transmits an electrical signal to the electronic control device 30 via an electrical signal line 44, said electrical signal being formed depending on the switching pressure of the pressure switch 42 being reached/exceeded or undershot.

The pressure storage container which is connected to the supply line 38, the rear axle channel 24 of the foot brake pedal 28, the control line 40, the two pressure control valves 14, the brake cylinders 10, 12 and also the wheel brakes which are operated by said brake cylinders then form a rear axle brake circuit of the brake device 1. Analogously, the pressure storage container which is connected to the supply line 34, the front axle channel 22 of the foot brake pedal 28, the control line 36, the two pressure control valves 14, the brake cylinders 4, 6 and also the wheel brakes which are operated by said brake cylinders then form a front axle brake circuit of the brake device 1.

The control device 30 may be configured such that the brake force distribution between the brakes 4, 6 of the front axle 2 and the brakes 10, 12 of the rear axle 8 may take place depending on a differential speed vVA-vHA between the wheel speeds vVA of the wheels of the front axle 2 and the wheel speeds vHA of the wheels of the rear axle 8. For this purpose, the control device 30 receives signals indicating the wheel rotation speeds of the wheels of the front axle 2 and also signals indicating the wheel rotation speeds of the wheels of the rear axle 8 in each case from the assigned wheel rotation speed sensors 18 which are connected to the control device 30 via a further line network 46.

The differential speed vVA-vHA between the wheel speeds vVA of the wheels of the front axle 2 and the wheel speeds vHA of the wheels of the rear axle 8 is then calculated in the electronic control device 30 from the signals of the wheel rotation speed sensors 18. The electronic control device 30 comprises implemented control routines as part of an electronic regulation operation of the brake pressure or brake force distribution between the front axle 2 and the rear axle 8, which control routines limit the brake pressure in the brake cylinders 10, 12 of the rear axle 8 when a differential speed threshold value is exceeded by the differential speed vVA-vHA. In this case, the differential speed threshold value is stored in the electronic control device 30, for example as part of an EOL programming operation, or can also be selectively set.

The electronic control device 30 or the electronic regulation operation of the brake force distribution implemented there may be configured in such a way that it executes a brake slip regulation operation (ABS) when excessive brake slip is present, wherein the brake pressure at the rear axle 8 may be limited by the ABS pressure control valves 14 which are arranged in the rear axle brake circuit. These pressure control valves 14, which can be kept in a locked position or can be lowered to a venting position by the brake pressure which is input into the control line 40 from the rear axle channel 24, are then switched to their venting position until the pressure value which is desired by the regulation operation is reached. The brake pressure or brake force distribution between the front axle 2 and the rear axle 8 is electronically regulated or the brake pressure at the rear axle 8 is limited only while the pressure value which acts in the rear axle brake circuit or in the pressure switch 42 is below the switching pressure of the pressure switch 42, but the brake pressure at the rear axle 8 is not limited if this pressure value is equal to or greater than the prespecified switching pressure. In particular, the pressure switch 42 is configured such that it delivers an activation signal for electronically regulating the brake force or brake pressure distribution, which electronic regulation is implemented in the control device 30, when the pressure value which acts in the rear axle brake circuit is below the switching pressure of the pressure switch 42, and which otherwise does not deliver an activation signal of this kind. In particular, the switching pressure of the pressure switch 42 is freely adjustable.

In other words, electronic regulation of the brake pressure or brake force distribution is carried out until the switching pressure of the pressure switch 42 is reached by the pressure value or brake pressure value in the rear axle brake circuit, and the electronic regulation of the brake pressure or brake force distribution is turned off when a pressure value or brake pressure value is equal to or greater than the switching pressure.

The pressure threshold value or the switching pressure of the pressure switch 42 may be approximately 3 bar. Since the brake pressure is in a range of between 0 bar and approximately 2.5 bar in the majority of braking operations in pneumatic or electropneumatic brake systems of utility vehicles, the majority of the braking operations take place with the convenient electronic regulation of the brake force or brake pressure distribution. In rare cases, the brake pressure reaches or exceeds the pressure threshold value of approximately 3 bar.

If the front axle brake circuit then breaks down, but a front axle brake pressure is nevertheless formed, for example because the brake cylinders 4, 6 or the wheel brakes at the front axle 2 have a mechanical problem, the electronic brake pressure distribution which operates in accordance with the differential slip principle here establishes a relatively high differential slip between the wheels of the front axle 2 and the wheels of the rear axle 8 even though there is, for example, no tendency of the wheels at the rear axle 8 to lock and therefore no change in the brake pressure distribution would be necessary either. The driver determines the braking effect which is diminishing owing to the failure of the front axle brake circuit and then instinctively increases the braking request, as a result of which the brake pressure arising in the pressure switch 42 in the rear axle brake circuit increases and, when the switching pressure of the pressure switch 42 is exceeded, the pressure switch no longer delivers an activation signal for activating the electronic brake pressure distribution or keeping said electronic brake pressure distribution active. Consequently, the brake pressure at the rear axle 8 can no longer be limited, and for this reason the brake cylinders 10, 12 at the rear axle 8 are operated with the full brake pressure in relation to the braking request in order to be able to deliver as high a braking power as possible.

However, the activation signal for electronically regulating the brake pressure or brake force distribution is generated until the switching pressure of the pressure switch 42 is reached, so that said electronic regulation is active until said switching pressure is reached, this having a positive effect on driving stability because locking of the brakes of the rear axle is prevented even before, for example, the ABS regulation is active. When the switching pressure of the pressure switch 42 has then been reached or exceeded, the electronic regulation of the brake pressure or brake force distribution is turned off. However, the brake slip regulating arrangement (ABS) then ensures that excessive locking of the brakes at the rear axle 8 is avoided, so that driving stability is ensured in this case too.

Operation of the brake device 1 or the foot brake pedal 28 of said brake device is identified by the brake light switch signal which is output by the brake light switch 26, wherein the brake pressure at the rear axle 8 may be limited only when a brake light switch signal which represents operation of the foot brake pedal 28 is present, but the brake pressure at the rear axle 8 is not limited if a brake light switch signal which represents operation of the foot brake pedal 28 is not present.

Therefore, firstly the activation signal may be be generated by the pressure switch 42 and secondly the brake light switch signal, which represents operation of the brake, from the brake light switch 26 also has to be present in combination for activating the electronic brake pressure or brake force distribution or for limiting the rear axle brake pressure.

The List of reference symbols is as follows:
1 Brake device
2 Front axle
4 Brake cylinder
6 Brake cylinder
8 Rear axle
10 Brake cylinder
12 Brake cylinder
14 Pressure control valve
16 Brake line
18 Wheel rotation speed sensor
20 Brake value transmitter
22 Front axle channel
24 Rear axle channel
26 Brake light switch
28 Foot brake pedal
30 Control device
32 Line network
34 Supply line
36 Control line
38 Supply line
40 Control line
42 Pressure switch
44 Signal line
46 Line network

The invention claimed is:

1. A method for electronically regulating the brake force distribution in a pressure medium-operated brake system of a vehicle having at least one front axle brake circuit, which is associated with a front axle, and at least one rear axle brake circuit, which is associated with at least one rear axle, the method comprising:
regulating, when the brake system is operated, a rear axle brake pressure, which acts in the at least one rear axle brake circuit, to prevent locking of the rear wheels before locking of the front wheels;
wherein the brake pressure at the rear axle is limited only while a pressure value which acts in the rear axle brake circuit is below a prespecified pressure threshold value, and wherein the brake pressure at the rear axle is not limited if the pressure value which acts in the rear axle brake circuit is equal to or greater than the prespecified pressure threshold value.

2. The method of claim 1, wherein the brake system has at least one brake light switch and operation of the brake system is identified by a brake light switch signal, wherein the brake pressure at the rear axle is limited only when a brake light switch signal which represents operation of the brake system is present, and wherein the brake pressure at the rear axle is not limited if a brake light switch signal which represents operation of the brake system is not present.

3. The method of claim 1, wherein an electronic regulating device for providing the brake force distribution is regulated depending on a differential slip or differential speed between at least one wheel of the front axle and at least one wheel of the rear axle, wherein, when the brake system is operated and when a differential slip threshold value or a differential speed threshold value is exceeded by the differential slip or the differential speed, the brake pressure at the rear axle is limited.

4. A non-transitory computer readable medium having a computer program, which is executable by a processor, comprising:
a program code arrangement having program code for electronically regulating the brake force distribution in a pressure medium-operated brake system of a vehicle having at least one front axle brake circuit, which is associated with a front axle, and at least one rear axle brake circuit, which is associated with at least one rear axle, the by performing the following:
regulating, when the brake system is operated, a rear axle brake pressure, which acts in the at least one rear axle brake circuit, to prevent locking of the rear wheels before locking of the front wheels;
wherein the brake pressure at the rear axle is limited only while a pressure value which acts in the rear axle brake circuit is below a prespecified pressure threshold value, and wherein the brake pressure at the rear axle is not limited if the pressure value which acts in the rear axle brake circuit is equal to or greater than the prespecified pressure threshold value.

5. A pressure medium-operated brake system of a vehicle having at least one front axle brake circuit, which is associated with a front axle, and at least one rear axle brake circuit, which is associated with at least one rear axle, comprising:
an electronic regulating device for providing a brake force distribution, so that when the brake system is operated, a rear axle brake pressure, which acts in the at least one rear axle brake circuit, is regulated to prevent locking of the rear wheels before locking of the front wheels; and
at least one pressure switch, which is is provided in a brake circuit, which pressure switch generates an activation signal for activating the electronic regulating device for providing the brake force distribution depending on a pressure value, which acts in the brake circuit, in relation to a prespecified pressure threshold value;
wherein the electronic regulating device is configured so that the brake pressure at the rear axle is limited only while the activation signal is generated or is present, and wherein the brake pressure at the rear axle is not limited if an activation signal is not generated or is not present, wherein the brake circuit in which the pressure switch is provided is the rear axle brake circuit, and wherein the pressure switch is configured so that it delivers the activation signal when a pressure value, which acts in the rear axle brake circuit, falls below its switching pressure and which otherwise does not deliver an activation signal of this kind.

6. The pressure medium-operated brake system of claim 5, further comprising:
   at least one brake light switch;
   wherein the electronic regulating device for providing the brake force distribution is configured so that it identifies operation of the brake system by a brake light switch signal, wherein the brake pressure at the rear axle is limited only when a brake light switch signal which represents operation of the brake system is present, and wherein the brake pressure at the rear axle is not limited when a brake light switch signal which represents operation of the brake system is not present.

7. The pressure medium-operated brake system of claim 5, wherein the electronic regulating device for providing the brake force distribution is configured so that the brake force distribution is regulated depending on a differential slip or differential speed between at least one wheel of the front axle and at least one wheel of the rear axle, wherein, when the brake system is operated and a differential slip threshold value or a differential speed threshold value is exceeded by the differential slip or the differential speed, the brake pressure at the rear axle is limited.

8. The pressure medium-operated brake system of claim 7, further comprising:
   a sensor to measure wheel rotation speeds of the wheel of the front axle;
   another sensor to measure wheel rotation speeds of the wheel of the rear axle;
   an electronic control device to determine a differential slip or a differential rotation speed between the at least one wheel of the front axle and the at least one wheel of the rear axle;
   wherein the electronic control device is configured so that, when a differential slip threshold value or a differential speed threshold value is exceeded by the differential slip or by the differential speed, the brake pressure at the rear axle is limited.

9. The pressure medium-operated brake system of claim 8, wherein the electronic control device is further configured so that, when excessive brake slip is present, it executes a brake slip regulation operation (ABS), wherein the brake pressure at the rear axle is limited by at least one ABS pressure control valve which is arranged in the rear axle brake circuit.

10. The pressure medium-operated brake system of claim 5, wherein the pressure threshold value of the pressure switch is approximately 3 bar.

11. The non-transitory computer readable medium of claim 4, wherein the brake system has at least one brake light switch and operation of the brake system is identified by a brake light switch signal, wherein the brake pressure at the rear axle is limited only when a brake light switch signal which represents operation of the brake system is present, and wherein the brake pressure at the rear axle is not limited if a brake light switch signal which represents operation of the brake system is not present.

12. The non-transitory computer readable medium of claim 4, wherein an electronic regulating device for providing the brake force distribution is regulated depending on a differential slip or differential speed between at least one wheel of the front axle and at least one wheel of the rear axle, wherein, when the brake system is operated and when a differential slip threshold value or a differential speed threshold value is exceeded by the differential slip or the differential speed, the brake pressure at the rear axle is limited.

* * * * *